US012199492B2

(12) United States Patent
Cripsey et al.

(10) Patent No.: US 12,199,492 B2
(45) Date of Patent: Jan. 14, 2025

(54) ROTOR SHAFT

(71) Applicant: METAL FORMING & COINING CORPORATION, Maumee, OH (US)

(72) Inventors: Timothy John Cripsey, Rochester, MI (US); Robert Herston, New Baltimore, MI (US); Nicholas Brockett, Warren, MI (US)

(73) Assignee: METAL FORMING & COINING, LLC, Maumee, OH (US)

( * ) Notice: Subject to any disclaimer, the term of this patent is extended or adjusted under 35 U.S.C. 154(b) by 269 days.

(21) Appl. No.: 17/657,282

(22) Filed: Mar. 30, 2022

(65) Prior Publication Data

US 2022/0320948 A1 Oct. 6, 2022

Related U.S. Application Data

(60) Provisional application No. 63/264,483, filed on Nov. 23, 2021, provisional application No. 63/264,462,
(Continued)

(51) Int. Cl.
*H02K 5/20* (2006.01)
*F16C 3/02* (2006.01)
*H02K 7/00* (2006.01)
*H02K 9/19* (2006.01)
*H02K 11/21* (2016.01)
(Continued)

(52) U.S. Cl.
CPC .............. *H02K 5/203* (2021.01); *F16C 3/02* (2013.01); *H02K 7/003* (2013.01); *H02K 9/19* (2013.01); *H02K 11/21* (2016.01); *H02K 15/14* (2013.01); *H02K 24/00* (2013.01); *F16C 2220/46* (2013.01); *F16C 2380/26* (2013.01)

(58) Field of Classification Search
CPC .......... H02K 5/203; H02K 11/21; H02K 9/19; H02K 15/14; H02K 24/00
USPC ................................................ 310/60 A, 114
See application file for complete search history.

(56) References Cited

U.S. PATENT DOCUMENTS

| 5,379,622 A | 1/1995 | Saito et al. |
| 7,021,171 B2 | 4/2006 | Huber et al. |
| (Continued) | | |

FOREIGN PATENT DOCUMENTS

| JP | 09051657 A | * 2/1997 | |
| WO | WO-2017215686 A1 | * 12/2017 | ............... H02K 1/32 |
| WO | WO-2020159894 A1 | * 8/2020 | ............... F16C 3/023 |

OTHER PUBLICATIONS

Machine Translation JP09051657 (Year: 1997).*

*Primary Examiner* — Jose A Gonzalez Quinones
(74) *Attorney, Agent, or Firm* — James D. Miller; Shumaker, Loop & Kendrick, LLP

(57) ABSTRACT

A rotor shaft for an electric motor includes an axially extending tubular body having an inner circumferential surface defining a hollow interior thereof with at least a portion of the hollow interior configured to receive a coolant therein. A plurality of circumferentially spaced splines extends radially inwardly from the inner circumferential surface into the portion of the hollow interior configured to receive the coolant therein. Each of the splines is configured to provide a heat exchanging structure for transferring heat from the rotor shaft to the coolant. The splines are one of integrally formed with the tubular body or provided as inserts captured by the tubular body during a flow forming process.

18 Claims, 7 Drawing Sheets

Related U.S. Application Data filed on Nov. 23, 2021, provisional application No. 63/168,010, filed on Mar. 30, 2021.

(51) Int. Cl.
   *H02K 15/14*     (2006.01)
   *H02K 24/00*     (2006.01)

(56) References Cited

U.S. PATENT DOCUMENTS

| | | |
|---|---|---|
| 7,328,492 B2 | 2/2008 | Huber et al. |
| 8,701,454 B2 | 4/2014 | Cripsey et al. |
| 8,833,124 B2 | 9/2014 | Cripsey et al. |
| 2017/0237316 A1* | 8/2017 | Filgertshofer ......... H02K 7/083 310/52 |
| 2018/0238307 A1 | 8/2018 | Campbell |

* cited by examiner

ROTOR SHAFT

CROSS-REFERENCE TO RELATED APPLICATIONS

This patent application claims priority to U.S. Provisional Patent Application Ser. No. 63/168,010 filed on Mar. 30, 2021, U.S. Provisional Patent Application Ser. No. 63/264,462 filed on Nov. 23, 2021, and U.S. Provisional Patent Application Ser. No. 63/264,483 filed on Nov. 23, 2021, the entire disclosures of which are hereby incorporated herein by reference.

FIELD OF THE INVENTION

The present invention relates generally to a rotor shaft for an electric motor, and more particularly, to a hollow rotor shaft having a coolant flow path formed therethrough and internal splines for improving a heat transfer capacity of the rotor shaft.

BACKGROUND OF THE INVENTION

Rotor shafts for use in electric motors have traditionally been formed to include a solid construction devoid of internal voids. However, there has been a recent trend towards the use of hollow rotor shafts to allow for the formation of a cooling fluid flow path therein. The cooling fluid may be used to remove and reuse heat generated within the rotor shaft to avoid heat-related losses within the motor that can contribute to motor inefficiency. Such hollow rotor shafts may be formed by reducing the dimension of a hollow tube at each axial end thereof for installation into the corresponding electric vehicle.

However, the hollow rotary shafts of the prior art are typically formed to be devoid of surface area increasing features allowing for improved heat transfer from the rotary shaft to the cooling fluid, and are instead provided as substantially axially symmetric structures. As such, a heat exchange efficiency of such hollow rotary shafts may not be sufficient for performing the necessary heat transfer therefrom for preventing the loss of heat from the corresponding electric motor. Additionally, the axially symmetric structure of such rotary shafts also renders it difficult to incorporate additional features into the structure of the rotary shaft, such as circumferentially spaced surface projections or indentations acting as torque transmitting features or rotational velocity sensing features.

Furthermore, in some circumstances, the hollow rotary shaft may require the entry and exit of the cooling liquid circulated therein formed at a common axial end thereof, which requires the formation of a pair of flow paths at the common axial end. For example, an inner tube may be disposed within the hollow interior of the rotary shaft for defining a first flow path within the interior of the inner tune and a second flow path between the exterior of the inner tube and the interior of the surrounding rotary shaft. Such a configuration typically requires the independent formation and then subsequent coupling of the inner tube and the surrounding rotary shaft in a manner complicating the assembly of the rotary shaft assembly. Furthermore, such assembly may include the need to seal additional joints and surfaces to account for the separation of the distinct flow paths while also preventing entry of the cooling fluid into undesired regions of the rotary shaft assembly or corresponding electric motor.

It is accordingly desirable to produce a hollow rotary shaft having improved heat exchange capabilities and enhanced functionality. It is further desirable to provide a simplified and efficient manufacturing process for producing such an improved hollow rotary shaft.

SUMMARY OF THE INVENTION

Concordant and congruous with the present invention, a hollow rotor shaft having a heat exchanging feature for transferring heat from the rotor shaft has surprisingly been discovered, as has a method of manufacturing the same.

According to an embodiment of the present invention, a rotor shaft for an electric motor includes an axially extending tubular body having an inner circumferential surface defining a hollow interior thereof with at least a portion of the hollow interior configured to receive a coolant therein. A plurality of circumferentially spaced splines extends radially inwardly from the inner circumferential surface into the portion of the hollow interior configured to receive the coolant therein. Each of the splines is configured to provide a heat exchanging structure for transferring heat from the rotor shaft to the coolant. The splines are one of integrally formed with the tubular body or provided as inserts captured by the tubular body during a flow forming process.

A method of manufacturing a rotor shaft is also disclosed. The method comprises the steps of providing a mandrel having an indentation formed in an outer circumferential surface thereof; positioning a cooling insert in the indentation; positioning a circumferential wall of a shaft preform around the outer circumferential surface of the mandrel; and flow forming the circumferential wall towards the cooling insert to capture the cooling insert.

BRIEF DESCRIPTION OF THE DRAWINGS

The above, as well as other advantages of the present invention, will become readily apparent to those skilled in the art from the following detailed description of a preferred embodiment when considered in the light of the accompanying drawings.

DETAILED DESCRIPTION OF EXEMPLARY

Embodiments of the Invention

Figure 1:
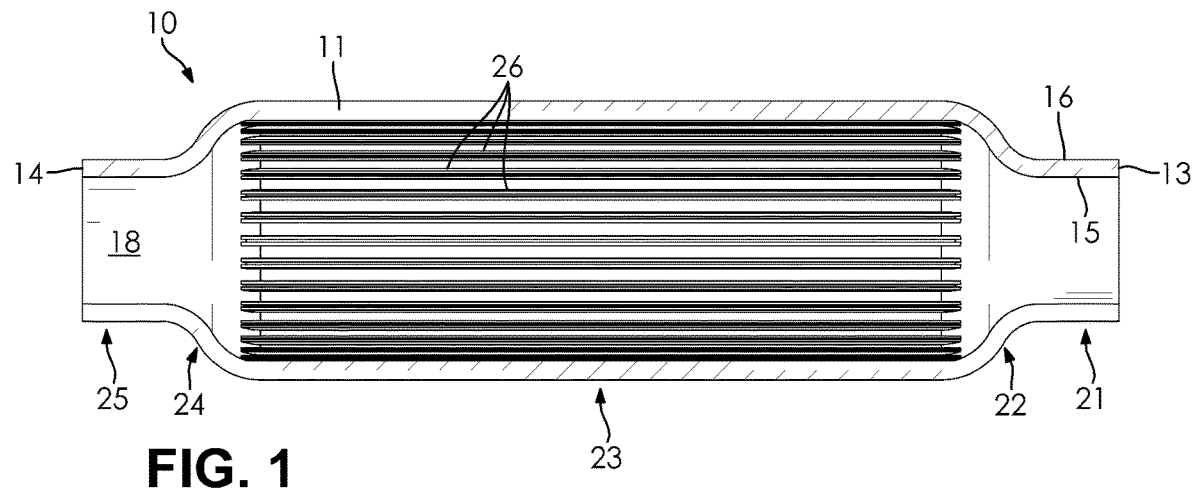
FIG. 1 is an elevational cross-sectional view of a rotor shaft having axially extending splines according to an embodiment of the present invention.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 illustrates a rotor shaft 10 according to an embodiment of the present invention. The rotor shaft 10 may be utilized in an electric motor of an electric vehicle, but it should be appreciated that the benefits of the rotor shafts 10 as described herein may be applicable to any apparatus or mechanism having a rotor in need of cooling, as desired. The rotor shaft 10 may be configured to rotate about a central axis thereof in reaction to an electromagnetic field being generated relative to the rotor shaft 10.

The rotor shaft 10 is formed by a hollow and tubular body including a circumferential wall 11 extending axially from a first end 13 to an opposing second end 14 thereof. The circumferential wall 11 includes an inner circumferential surface 15 and an oppositely arranged outer circumferential surface 16, each of which extends from the first end 11 to the second end 12, such that each of the ends 11, 12 may be considered to be open ends. The inner circumferential surface 15 defines a hollow interior 18 of the rotor shaft 10 also extending from the open first end 13 to the open second end 14.

The circumferential wall 11 may be divided axially into a first end portion 21, a first transition portion 22, a splined portion 23, a second transition portion 24, and a second end portion 25. The first end portion 21 and the second end portion 25 are each substantially cylindrical in shape, hence each of the end portions 21, 25 includes the inner and outer circumferential surfaces 15, 16 of the circumferential wall 11 extending in the axial direction of the rotor shaft 10. The end portions 21, 25 may be shaped to conform to or mate with a corresponding structure within an electric motor during installation and use of the resulting rotor shaft 10. As such, the end portions 21, 25 may alternatively be referred to as the first and second engaging portions 21, 25 of the rotor shaft 10 configured for engagement with an external component such as a bearing assembly of the motor housing or a component configured to transfer the rotational motion of the rotor shaft 10. One or both of the end portions 21, 25 may be capped, or may receive another component therein, in order to delimit the hollow interior 18 with respect to the axial direction, as desired.

With respect to the outer circumferential surface 16, the first transition portion 22 includes an annular concave surface and then an annular convex surface when extending from the first end portion 21 towards the splined portion 23, whereas with respect to the inner circumferential surface 15, the first transition portion 22 includes a corresponding annular convex surface and then an annular concave surface when extending from the first end portion 21 towards the splined portion 23. With respect to the outer circumferential surface 16, the second transition portion 24 includes an annular concave surface and then an annular convex surface when extending from the second end portion 25 towards the splined portion 23, whereas with respect to the inner circumferential surface 15, the second transition portion 24 includes a corresponding annular convex surface and then an annular concave surface when extending from the second end portion 25 towards the splined portion 23. However, the transition portions 22, 24 may have alternative configurations including alternative curvatures or alternative axially symmetric shapes, including being frustoconical in shape, without necessarily departing from the scope of the present invention. In some embodiments, one or more of the transition portions 22, 24 is exclusively concave in shape with respect to the outer circumferential surface 16, exclusively convex with respect to the outer circumferential surface 16, or a combination of the curvatures and/or inclinations shown and described.

The cylindrical splined portion 23 is centrally located with respect to the axial direction of the rotor shaft 10 and may include a greater diameter (both inner and outer) than either of the end portions 21, 25. Each of the transition portions 22, 24 accordingly corresponds to a portion of the circumferential wall 11 connecting the reduced diameter of one of the end portions 21, 25 to the enlarged diameter splined portion 23. In the present embodiment, the end portions 21, 25 include the same diameters, but the end portions 21, 25 may include different diameters from one another without departing from the scope of the present invention.

The splined portion 23 includes a plurality of splines 26 projecting radially inwardly from the inner circumferential surface 15 towards the central axis of the rotor shaft 10. The splines 26 are spaced apart from one another with respect to the circumferential direction of the circumferential wall 11, and the splines 26 extend longitudinally in the axial direction of the circumferential wall 11. Each of the splines 26 may include a substantially rectangular, trapezoidal, or triangular cross-sectional shape. The splined portion 23 may include any number of the splines 26, and the splines 26 may be spaced from each other by any desired angular displacement, without necessarily departing from the scope of the present invention. The splines 26 may also extend along any length of a cylindrical portion of the rotor shaft 10 corresponding to the described splined portion 23, as desired. The splines 26 may also include any depth, as measured in the radial direction of the rotor shaft 10, or any base width, as measured in a direction tangential to the inner circumferential surface 15 along the splined portion 23, as desired. The surfaces of each of the splines 26 extending at least partially in the radial direction of the rotor shaft 10 may include any inclination with respect to the radial direction in forming any of the possible spline shapes described herein. The splines 26 may also include curved or radiused surfaces where different features transition from extending radially to extending circumferentially/tangentially, as desired. The splines 26 may also vary in form and type about the circumference of the circumferential wall 11, including alternating or patterned occurrences of splines 26 of different depths, base widths, or cross-sectional shapes, as desired.

The rotor shaft 10 as shown and described may be manufactured using a flow forming process and corresponding apparatus similar to those disclosed in any one of U.S. Pat. Nos. 7,021,171, 7,328,492, 8,701,454, or U.S. Pat. No. 8,833,124, each of which is hereby incorporated herein by reference in its entirety. The flow forming process may include the use of a mandrel (not shown) having a plurality of circumferentially spaced and radially inwardly extending indentations formed within an outer circumferential surface thereof with each of the indentations corresponding to one of the splines 26. A cylindrical blank or a tubular preform of material may be positioned relative to the mandrel for initiating of the flow forming process, which includes a plurality of rollers compressing the material forming the blank or preform as the rollers progress axially relative to the mandrel. The radial inward compression of the forming material causes the forming material to flow into the indentations and conform to the shape thereof, thereby forming the radially inwardly extending splines 26 as shown herein.

In other embodiments, the splines 26 may be formed in a cold forging or hot forging process used to form at least some, if not all, of the disclosed features of the rotor shaft 10. The forging process may include an outer die receiving a tubular shaft preform and an inner die or hammer being axially received into a hollow interior of the shaft preform and then axially advanced to compress the shaft preform in accordance with the engaging surfaces of the outer die and the inner die. The inner die may include an outer circumferential surface having a plurality of radially inwardly extending indentations formed therein that correspond to the configuration of the splines 26. The advancement of the inner die within the hollow interior of the shaft preform causes an inner circumferential surface of the shaft preform to conform to the shape of the indentations, thereby forming the splines 26.

The hollow interior 18 of the rotor shaft 10 may be configured to receive a fluid acting as a coolant, such as an oil associated with the electric motor, in order to promote heat transfer away from the rotor shaft 10 during operation thereof. The coolant may be routed through the hollow interior 18 in a variety of different configurations depending on the structure of the adjoining electric motor. In some embodiments, the coolant flows axially between the opposing ends 13, 14. In other embodiments, the coolant originates at one of the ends 13, 14, flows towards the other of the ends 13, 14, and then flows back towards the originating one of the ends 13, 14. In either event, at least some of the coolant flows along the inner circumferential surface 15 along the splined portion 23 having the plurality of the splines 26 formed therein.

The inclusion of the splines 26 along the inner circumferential surface 15 substantially increases a surface area of the splined portion 23 in comparison to a purely cylindrical or otherwise axially symmetric shape. For example, the splined portion 23 as depicted in FIG. 1 may include about 70% more surface area than would a purely cylindrical surface. The amount of increase in surface area of the inner circumferential surface 15 along the splined portion 23 in comparison to a cylindrical surface may be adjusted by increasing or decreasing the number of the splines 26, the circumferential spacing between splines 26, the axial length of the splines 26, the depth or base width of the splines 26, the inclination of the surfaces forming the splines 26, or the cross-sectional shape of the splines 26, as desired.

The inclusion of the splines 26 may also, in some circumstances, improve the mixing of the coolant passing through the hollow interior 18 of the rotor shaft 10 in order to further increase the heat exchange capabilities of the rotor shaft 10. Specifically, the flow of the coolant over the splines 26 results in at least some of the coolant changing directions when encountering edges or transitions in shape present within the splines 26, which in turn improves mixing of the coolant within the hollow interior 18 of the rotor shaft 10.

The increase in the surface area of the rotor shaft 10 as well as the promotion of improved mixing of the coolant promotes greater and more uniform heat transfer between the rotor shaft 10 and the coolant, which aids in cooling the rotor shaft 10 more efficiently. The efficient cooling of the rotor shaft 10 can in turn lead to increased efficiency of the associated electric motor. Furthermore, the increase in heat transfer can be utilized in some systems to transfer heat from the rotor shaft 10 to another component or fluid of the electric motor or associated vehicle, thereby increasing the efficiency of such a system by avoiding the wasting of the heat generated by the rotor shaft 10 that could otherwise be utilized by another component and/or process.

Figure 2:
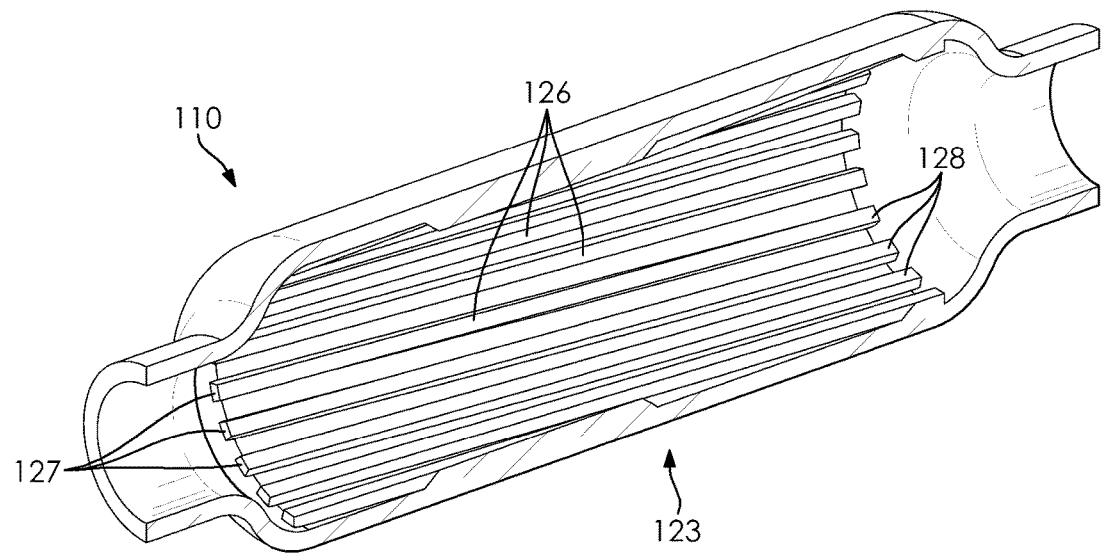
FIG. 2 is a perspective cross-sectional view of a rotor shaft having axially inclined splines according to another embodiment of the present invention.

FIG. 2 illustrates a rotor shaft 110 according to another embodiment of the present invention. The rotor shaft 110 is substantially identical to the rotor shaft 10 with the exception of a modified splined portion 123 and corresponding splines 126, hence description of the remainder of the rotor shaft 110 is omitted herefrom as reference may be made to the description of FIG. 1 with respect to such features.

The splines 126 of the splined portion 123 differ from the splines 26 of the splined portion 23 by being inclined with respect to the axial direction of the rotor shaft 10, thereby resulting in opposing ends 127, 128 of each of the splines 126 being angularly offset from one another. The inclination of the splines 126 may include the splines 126 being substantially helical in shape, as desired.

The inclination of the splines 126 in the manner described may aid in further promoting heat transfer from the rotor shaft 110 by producing a flow configuration within a hollow interior 118 of the rotor shaft 110 wherein the portion of the coolant flowing axially along the splines 126 flows at least partially across the direction of extension of such splines 126, thereby further promoting the incidence of fluid mixing as described above with regards to the parallel arranged splines 26 of the rotor shaft 10.

The rotor shaft 110 may be formed by the same methods disclosed hereinabove with reference to the rotor shaft 10. Specifically, the rotor shaft 110 and the corresponding splines thereof may be formed by flow forming, cold forging, or hot forging using similar techniques to those described above, except those features of the corresponding die or mandrel utilized in the formation of the splines 126 must be inclined in the same manner for creating the inclined splines in accordance with the illustration of FIG. 2.

Figure 3:
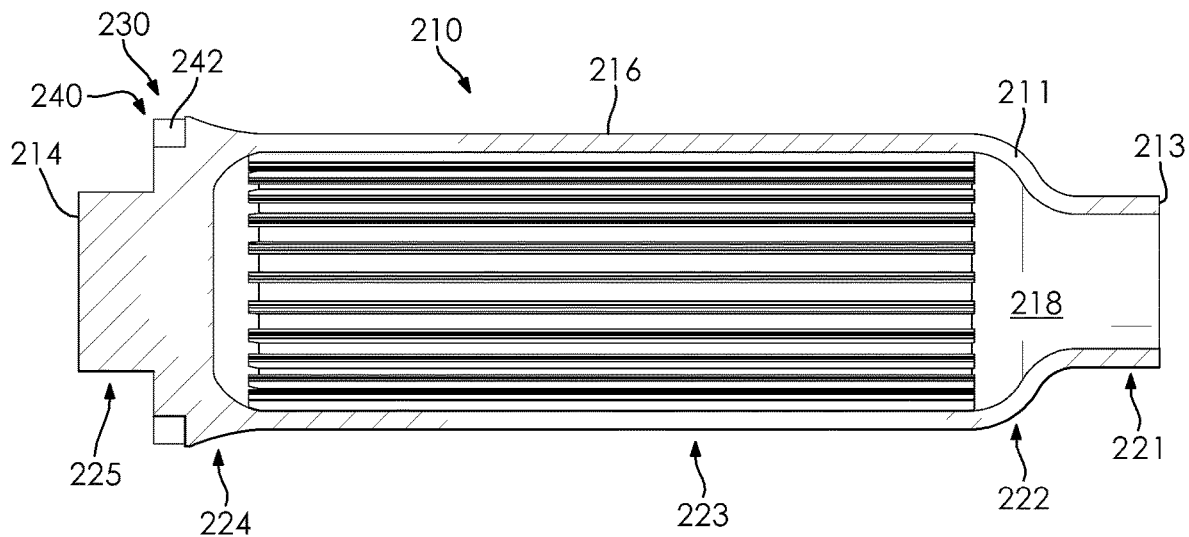
FIG. 3 is an elevational cross-sectional view of a rotor shaft having an integrally formed sensing structure according to another embodiment of the present invention.
Figure 4:
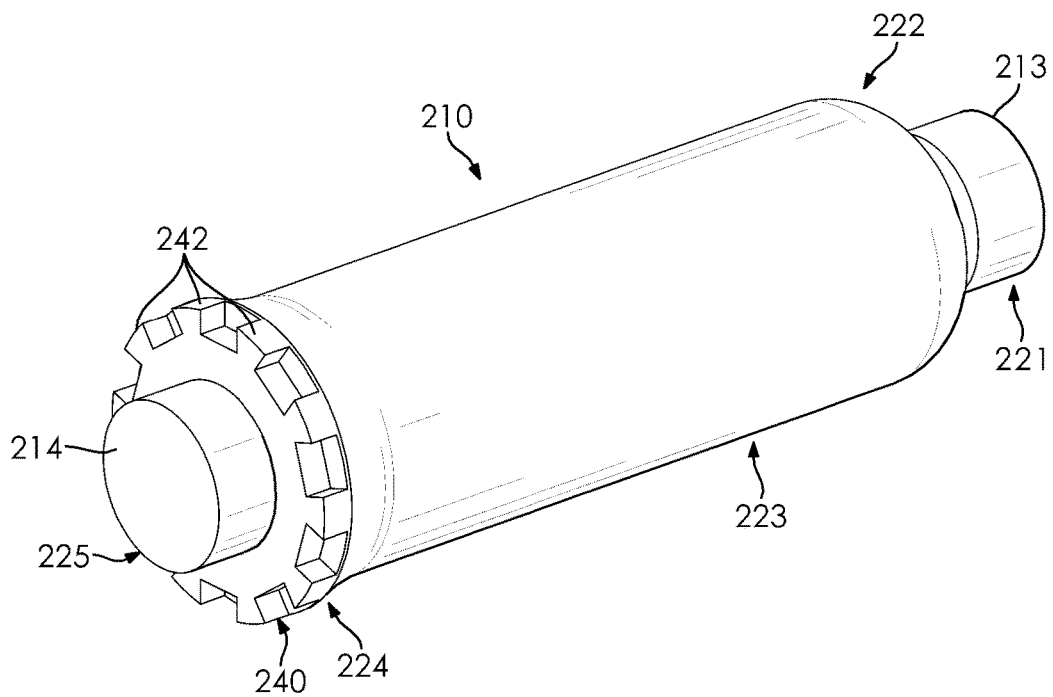
FIG. 4 is a rear perspective view of the rotor shaft of FIG. 3.

Referring now to FIGS. 3 and 4, a rotor shaft 210 according to yet another embodiment of the present invention is disclosed. The rotor shaft 210 is substantially similar to the rotor shaft 10 and includes, as the rotor shaft 210 extends from a first end 213 to an opposing second end 214 thereof, a first end portion 221, a first transition portion 222, a splined portion 223, a sensing portion 224, and a second end portion 225. The first end portion 221, first transition portion 222, and splined portion 223 are each formed by a circumferential wall 211 having the same features and configurations as disclosed with respect to the first end portion 21, the first transition portion 22, and the splined portion 23 of the rotor shaft 10, hence further description is omitted herefrom.

The rotor shaft 210 differs from the rotor shaft 10 in one respect by axially delimiting the hollow interior 218 of the rotor shaft 210 at the end of the splined portion 223 disposed distal from the first end portion 221 by the inclusion of the solid (non-hollow) sensing portion 224 and second end portion 225 at the second end 214 of the rotor shaft 210. However, the rotor shaft 210 is not necessarily limited to this configuration, and may instead include the hollow interior 218 extending from the first end 213 to the second end 214 with the sensing portion 224 and the second end portion 225 hollowed out, as desired. However, the use of such a configuration may frustrate the use of certain manufacturing processes described hereinafter as being suitable in forming the rotor shaft 210.

The second end portion 225 may be substantially cylindrical in shape and may be configured to mate with or otherwise be coupled to a corresponding structure of the associated electric motor at the second end 214 of the rotor shaft 210. However, the second end portion 225 may include substantially any suitable configuration for coupling to the associated structure while remaining within the scope of the present invention. In any event, the second end portion 225 includes a smaller outer diameter than that of the splined portion 223.

The sensing portion 224 is shown as being formed at the location of a shoulder 230 where the larger diameter splined portion 223 is reduced in diameter to the smaller diameter second end portion 225. The sensing portion 224 may include the outer circumferential surface 216 of the rotor shaft 210 flaring radially outwardly when progressing axially away from the splined portion 223 and towards the shoulder 230 before transitioning to a sensing structure 240 of the rotor shaft 210. The sensing structure 240 refers to a structural feature of the rotor shaft 210 configured to aid in the sensing of the incremental or relative rotational motion and/or instantaneous rotational position of the rotor shaft 210 during operation thereof, such as counting the number of revolutions of the rotor shaft 210 that have occurred over a period of time for an incremental movement or determining an absolute rotational position of the rotor shaft 210. The sensing structure 240 may be representative of an integrally formed reluctor wheel or speed sensor including a plurality of circumferentially spaced teeth 242 formed in the outer circumferential surface 216 at the position of the shoulder 230. As used herein, the sensing structure 240 being integrally formed with the tubular body forming the rotor shaft 210 refers to the components being continuously and monolithically formed absent any form of joint or seam therebetween. The teeth 242 may be presented as an alternating pattern of indentations and/or projections formed in the outer circumferential surface 216, as desired. The teeth 242 may be configured to be detected by a magnetic sensor or the like each time one of the teeth 242 passes thereby during rotation of the rotor shaft 210. In other embodiments, an alternative form of sensor configured to identify the presence or passage of the teeth 242 (or another similar circumferentially repeating surface feature or structure of the rotor shaft 210) may be utilized, such as a mechanical or optical sensing mechanism, as desired.

The rotor shaft 210 as shown in FIGS. 3 and 4 may be formed using a cold forging or hot forging process in order to facilitate the integral formation of the sensing portion 224 into the structure of the rotor shaft 210. A forging process may be preferred to a flow forming process in order to accommodate the thickness of the material necessary at the location of the sensing portion 224 in forming the necessary teeth 242 without otherwise negatively affecting the formation of the remaining features of the rotor shaft 210 adjacent the sensing portion 224. The forging process may include an outer die having an inner circumferential surface substantially corresponding in shape to the structure of the sensing portion 224 such that the advancement of a corresponding inner die (hammer) causes the formation of the disclosed structure. The use of the forging process beneficially allows for the hollow interior 218 of the rotor shaft 210 to be delimited in the axial direction where it is desirable for the rotor shaft 210 to be solid and non-hollow in structure while also facilitating an efficient and timely formation of the sensing portion 224 (and the adjacent second end portion 225).

Figure 5:
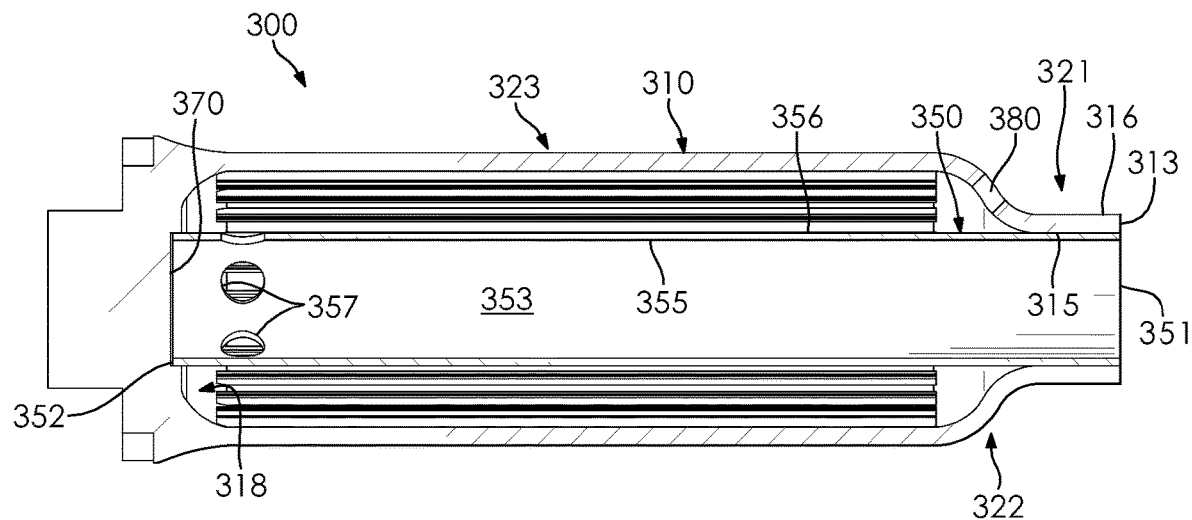
FIG. 5 is an elevational cross-sectional view of a rotor shaft having an inner tube according to another embodiment of the present invention.
Figure 6:
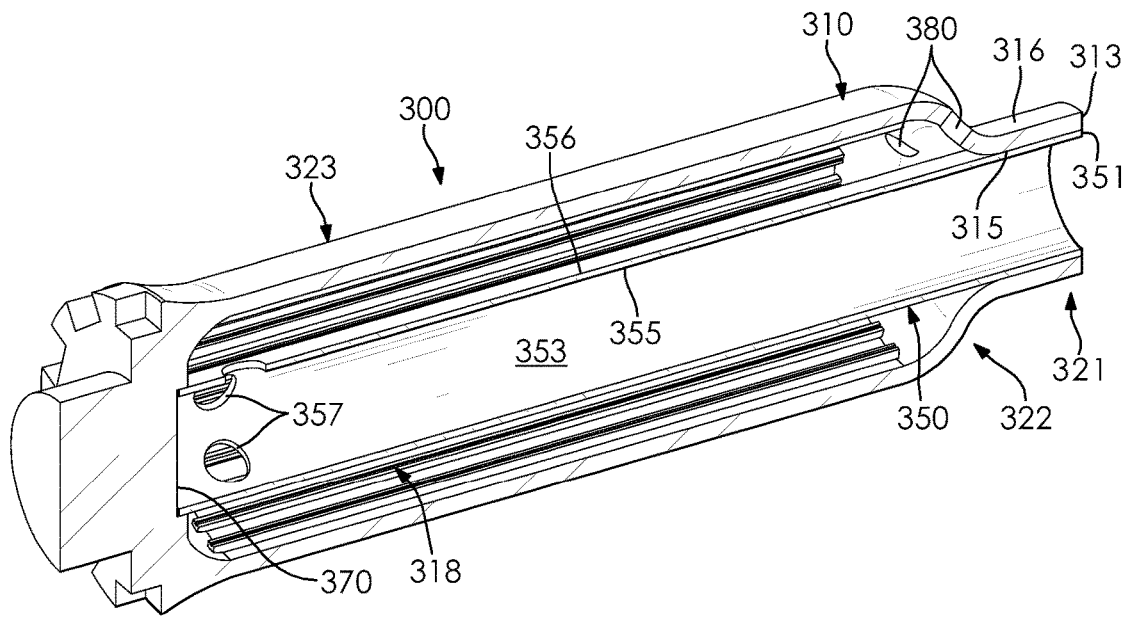
FIG. 6 is a perspective cross-sectional view of the rotor shaft of FIG. 5.
Figure 7:
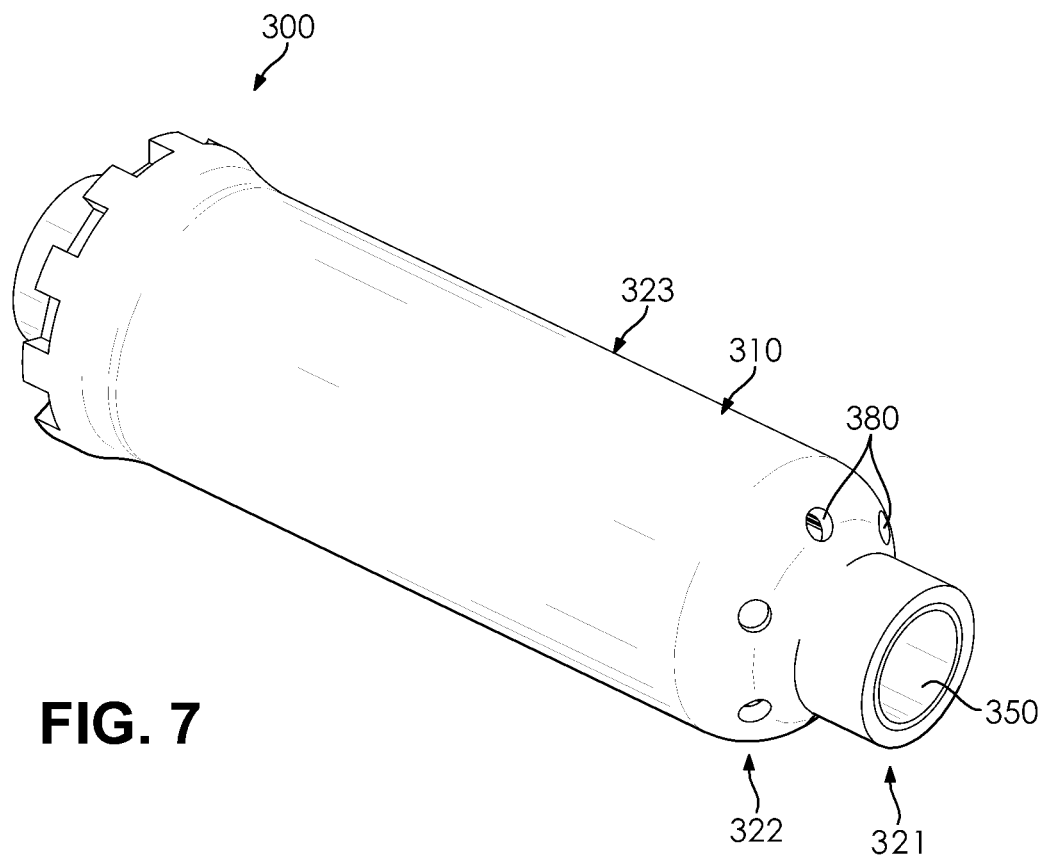
FIG. 7 is a front perspective view of the rotor shaft of FIG. 5.

FIGS. 5-7 illustrate a rotor shaft 300 according to another embodiment of the present invention. The rotor shaft 300 includes a two-part construction including each of an outer tube 310 and an inner tube 350. As can be seen by comparison between FIGS. 3 and 4 and FIGS. 5-7, the outer tube 310 includes substantially the same structure as the rotor shaft 210 with the exception of the introduction of features configured to accommodate the reception of the inner tube 350 within the outer tube 310 while forming a continuous flow path through the rotor shaft 300, wherein such features are described in detail hereinafter. The features common to each of the rotor shaft 210 and the outer tube 310 are thus omitted from further description hereinafter.

The inner tube 350 is substantially cylindrical in shape and extends axially from an open first end 351 to an opposing open second end 352. The inner tube 350 includes a cylindrical hollow interior 353 defined by a cylindrically shaped inner circumferential surface 355 thereof. The inner tube 350 includes at least one communication opening 357 formed therethrough. Each of the communication openings 357 extends radially from the inner circumferential surface 355 to an outer circumferential surface 356 of the inner tube 350. The inner tube 350 is shown as including an annular array of the communication openings 357 with each of the communication openings 357 spaced from an adjacent one of the communication openings 357 with respect to the circumferential direction of the inner tube 350. However, alternative arrangements of the communication openings 357 may be utilized while remaining within the scope of the present invention, including different patterns of the communication openings 357 being present in the inner tube 350, such as an alternating offset arrangement of the communication openings 357. The communication openings 357 are formed within the inner tube 350 at a position axially closer to the second end 352 than the first end 351 thereof, and may include the communication openings 357 positioned immediately adjacent a distal end of the splined portion 323 of the outer tube 310 when the inner tube 350 is received within the outer tube 310 as shown in FIGS. 5-7.

The outer tube 310 includes a centrally disposed and cylindrically shaped and axially extending indentation 370 at an axial end of the hollow interior 318 of the outer tube 310 disposed opposite a first end portion 321 of the outer tube 310. The cylindrically shaped indentation 370 includes an inner diameter that substantially corresponds to an outer diameter of the second end 352 of the inner tube 350 to allow for the second end 352 to be press-fit into the indentation 370 when axially aligned therewith. The reception of the second end 352 into the indentation 370 also aligns the first end 351 of the inner tube 350 with the first end 313 of the outer tube 310 with respect to the axial direction of the rotor shaft 300. The outer diameter of the first end 351 may substantially match the inner diameter of the inner circumferential surface 315 of the outer tube 310 along the first end portion 321 thereof to provide a cylindrically shaped joint between the inner tube 350 and the first end portion 321.

The first transition portion 322 of the outer tube 310 also differs from that of the rotor shaft 210 in that the first transition portion 322 includes at least one communication opening 380 formed therethrough from the inner circumferential surface 315 to the outer circumferential surface 316. The at least one communication opening 380 is shown as an annular array of the communication openings 380 with each of the communication openings 380 spaced circumferentially from the adjacent ones of the communication openings 380. However, any pattern or arrangement of the communication openings 380 may be provided within the first transition portion 321 while remaining within the scope of the present invention.

The configuration of the rotor shaft 300 as shown and described results in the ability to form a flow path therethrough wherein a fluid such as a coolant can experience an axial cross-flow configuration with respect to the flows of the coolant to either radial side of the inner tube 350. For example, such a flow path may include the coolant entering a first flow space in form of the hollow interior 353 of the inner tube 350 via the open first end 351 thereof. The coolant flows axially towards the second end 352 of the inner tube 350, which is delimited axially by the end surface of the hollow interior 318 of the outer tube 310 as formed by the indentation 370. The coolant exits the first flow space radially outwardly through one of the communication openings 370 where the coolant enters a second flow space formed between the outer circumferential surface 356 of the inner tube 350 and the inner circumferential surface 315 of the outer tube 310, which coincides axially with the position of the splined portion 323 of the outer tube 310. The coolant flowing through the second flow space crosses the flow direction of the coolant flowing through the first flow space with respect to the opposing surfaces 355, 356 of the inner tube 350. The coolant exits the second flow space through one of the communication openings 380 and is redirected thereafter by a component disposed external to the rotor shaft 300, such as a housing of the associated electric motor. The communication openings 370 may accordingly be said to provide fluid communication between the described first and second flow spaces while the communication openings 380 may accordingly be said to provide fluid communication between the second flow space and an exterior of the outer tube 310, as desired.

The outer tube 310 may be formed into the general configuration thereof using any of the methods described herein with reference to the rotor shafts 10, 110, 210, including flow forming, cold forging, and hot forging. The cylindrical indentation 370 may be formed during the deforming of the outer tube 310 or may be machined in a separate process, as desired. According to one embodiment, the inner tube 350 is received into the hollow interior 318 of the outer tube 310 with the second end 352 thereof press fit into the indentation 370 prior to the completion of the formation of the first end portion 321 and the first transition portion 322 adjacent the first end 351 of the inner tube 350. Once so positioned, the deformation of the outer tube 310 is continued with respect to a suitable necking process performed with respect to the first end portion 321 and the first transition portion 322 that causes a reduction in the inner diameter of such features as the outer diameter of these same features is also reduced by the corresponding necking process. The necking process eventually causes the first end portion 321 to engage and compress radially inwardly against the first end 351 of the inner tube 350 to capture the inner tube 350 and prevent axial or radial movement of the inner tube 350 relative to the outer tube 310. The necking operation may be associated with a flow forming process, a forging process, or a tubing process, as desired.

Figure 8:
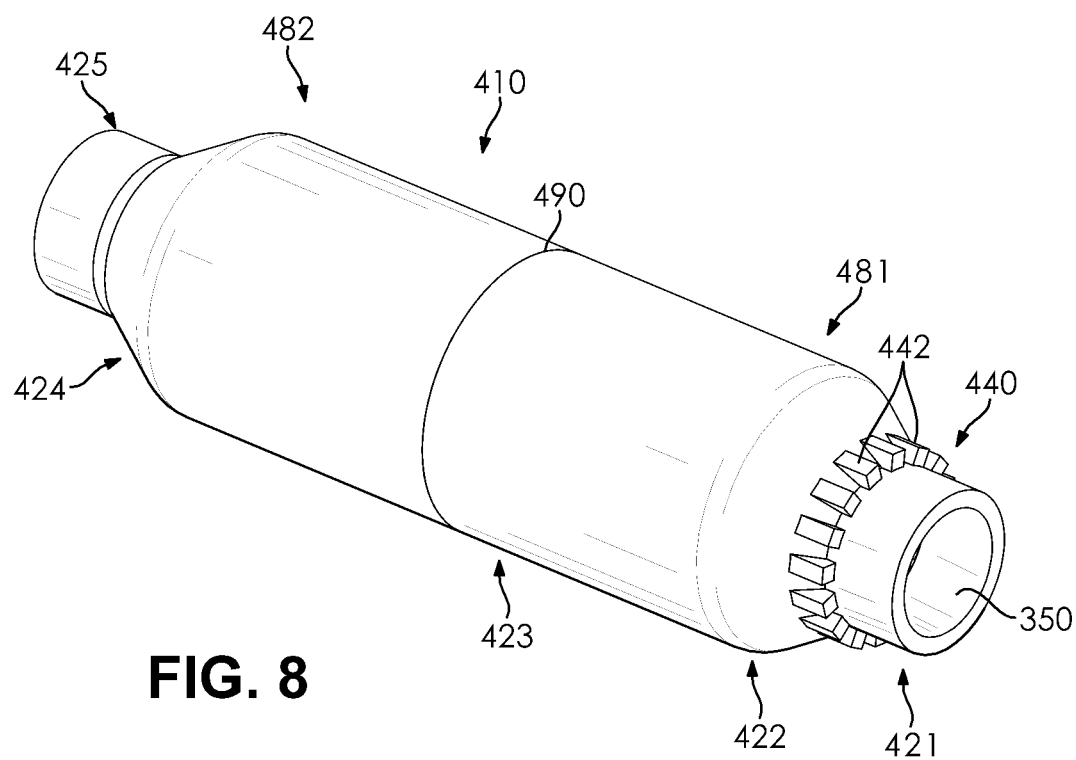
FIG. 8 is a front perspective view of a rotor shaft comprising two shaft segments according to another embodiment of the present invention.
Figure 9:
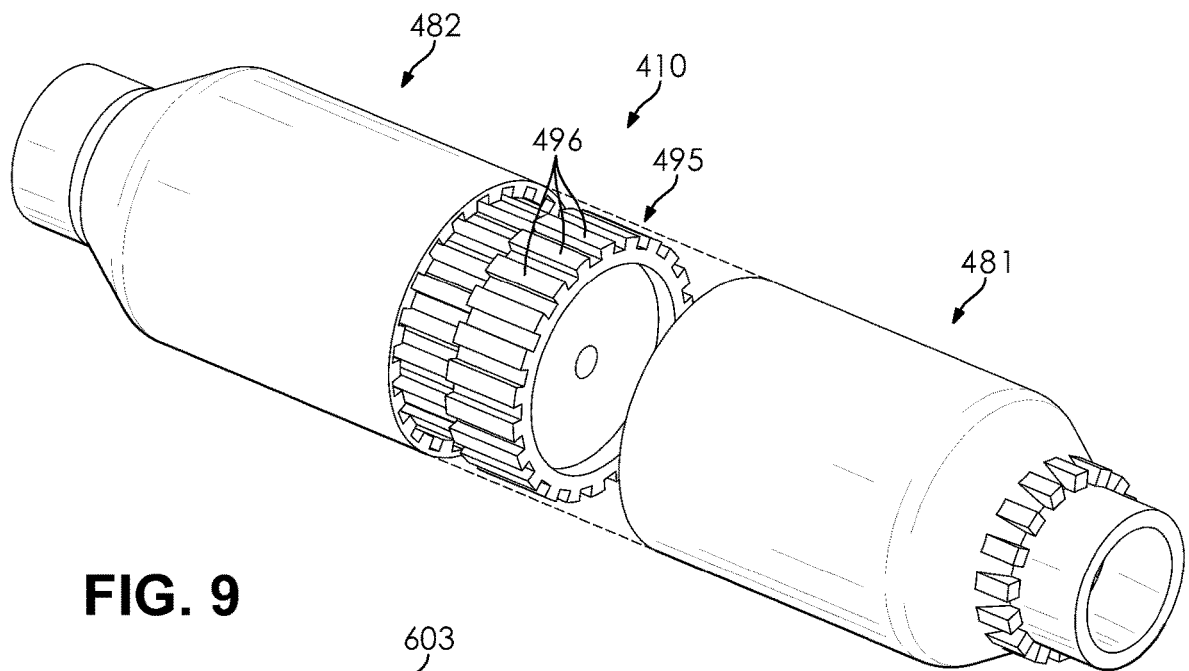
FIG. 9 is an exploded front perspective view of the rotor shaft of FIG. 8 illustrating an internally disposed connecting unit thereof.
Figure 10:
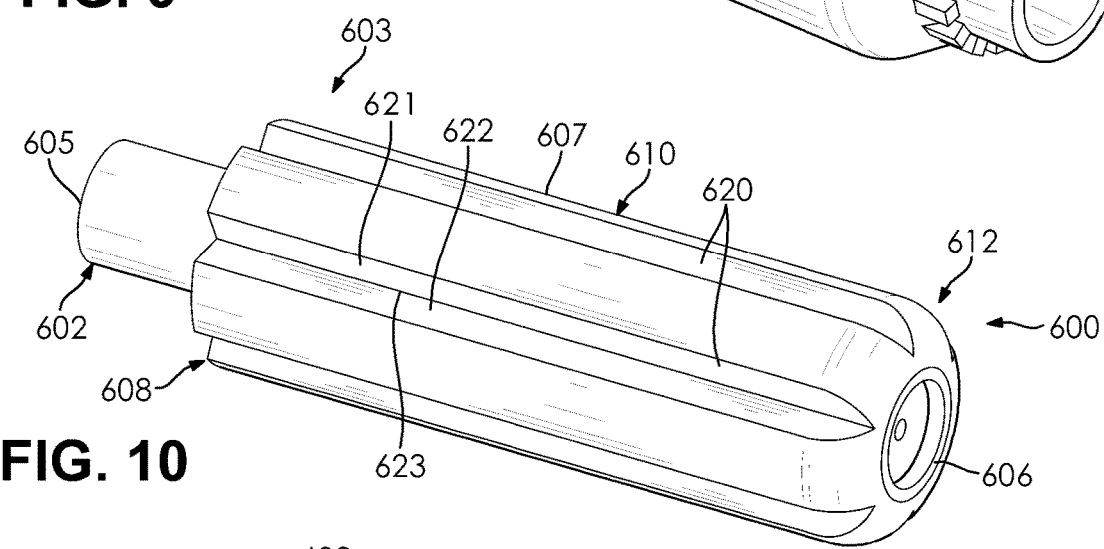
FIG. 10 is a front perspective view of a mandrel for performing a method of manufacturing a rotor shaft according to an embodiment of the present invention.

Referring now to FIGS. 8 and 9, a rotor shaft 410 according to another embodiment of the present invention is disclosed. The rotor shaft 410 is substantially similar in configuration to the rotor shaft 10, but is divided axially into a first shaft segment 481 and a second shaft segment 482. The shaft segment 481, 482 are symmetrically arranged about a plane arranged perpendicular to the central axis of the rotor shaft 410 such that each of the shaft segment 481, 482 may substantially correspond to an axial half of the rotor shaft 10 as disclosed in FIG. 1. The resulting rotor shaft 410 includes a first end portion 421, a first transition portion 422, a splined portion 423 formed by the cooperation of splines associated with each of the shaft segments 481, 482, a second transition portion 424, and a second end portion 425.

The rotor shaft segments 481, 482 meet each other at a joint 490 extending around a circumference of each of the shaft segments 481, 482. The joint 490 is arranged on a plane perpendicular to the central axis of the rotor shaft 410 and may be substantially annular in shape, and may include opposing splines of the opposing shaft segments 481, 482 aligned with each other to form continuous splines across the joint 490.

The rotor shaft 410 also differs from the rotor shaft 10 by the inclusion of a modified sensing structure 440 formed integrally with the first shaft segment 481 at the junction between the first end portion 421 and the first transition portion 422 of the rotor shaft 410. That is, the sensing structure 440 includes a plurality of circumferentially spaced teeth 442 at the concave surface where the first end portion 421 first started to flare radially outwardly at the first transition portion 422, as opposed to being formed at a convex surface formed by a perpendicular shoulder 230. The teeth 442 may once again be presented as an alternating pattern of indentations and/or projections, as desired, as may be sensed by a suitable sensing device.

Each of the shaft segments 481, 482 may be formed by any of the manufacturing processes described hereinabove with reference to the rotor shafts 10, 110, 210, 300, wherein common features may be formed by common manufacturing processes. The rotor shaft 410 may be assembled by axially aligning the first and second shaft segments 481, 482 at the joint 490 and performing an aggressive joining process such as friction welding, laser welding, or capacitor discharge (CD) welding along the joint 490.

Referring specifically to FIG. 9, the rotor shaft 410 may further include a connecting unit 495 configured to be disposed at least partially within each of the shaft segments 481, 482 while spanning the joint 490 formed therebetween. The connecting unit 495 may be substantially cylindrical in shape and may have an outer diameter substantially corresponding to an inner diameter of each of the adjoining shaft segments 481, 482 to allow for reception of the connecting unit 495 within the cylindrical hollow interior of each of the shaft segments 481, 482. In the embodiment shown in FIG. 9, the connecting unit 495 further includes a plurality of splines 496 having a shape, configuration, and arrangement configured to mate with the splines of each of the shaft segments 481, 482 adjacent the joint 490.

In some embodiments, the connecting unit 495 is located axially to span the joint 490 prior to the initiation of one of the previously disclosed welding processes, wherein the welding process extends radially through the joint 490 to join the connecting unit 495 to the shaft segments 481, 482. Alternatively, the connecting unit 495 and/or the splines of the shaft segments 481, 482 may be provided with a radially extending surface or feature (not shown) configured to axially stop progression of the axial motion of the connecting unit 495 into either of the hollow interiors of the shaft segments 481, 482. For example, a channel formed between adjacent splines of a first component may include a radially projecting feature that encounters a spline projecting from a second component while sliding axially within the channel, wherein the first and second components may be representative of the connecting unit 495 and any one of the shaft segments 481, 482.

The use of the connecting unit 495 provides numerous advantageous features to the rotor shaft 410. First, the connecting unit 495 can be provided to increase a rigidity of the rotor shaft 410, which in turn allows for each of the shaft segments 481, 482 to be formed with a reduced material thickness. This may result in an overall weight and cost reduction in forming the rotor shaft 410. Additionally, the connecting unit 495 may be provided as a locating feature for locating another structure of the rotor shaft 410, such as an inner tube similar to the inner tube 350. The connecting unit 495 may itself act as a form of heat exchanger or a locating device for an additional heat exchanger, and may include structures for increasing the surface area within the rotor shaft 410 that is exposed to a coolant fluid or for locating such surface area increasing features. The connecting unit 495 may also include any necessary communication openings or the like for communicating the coolant between the different shaft segments 481, 482, or may alternatively be provided as a partition for dividing the hollow interior of the rotor shaft 410 axially, as desired.

Figure 12:
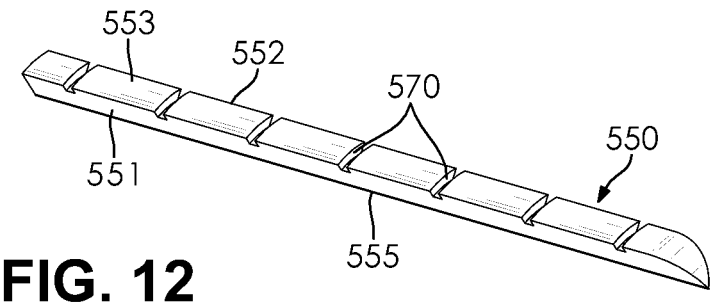
FIG. 12 is a front perspective view of one of the cooling inserts of FIG. 11.
Figure 13:
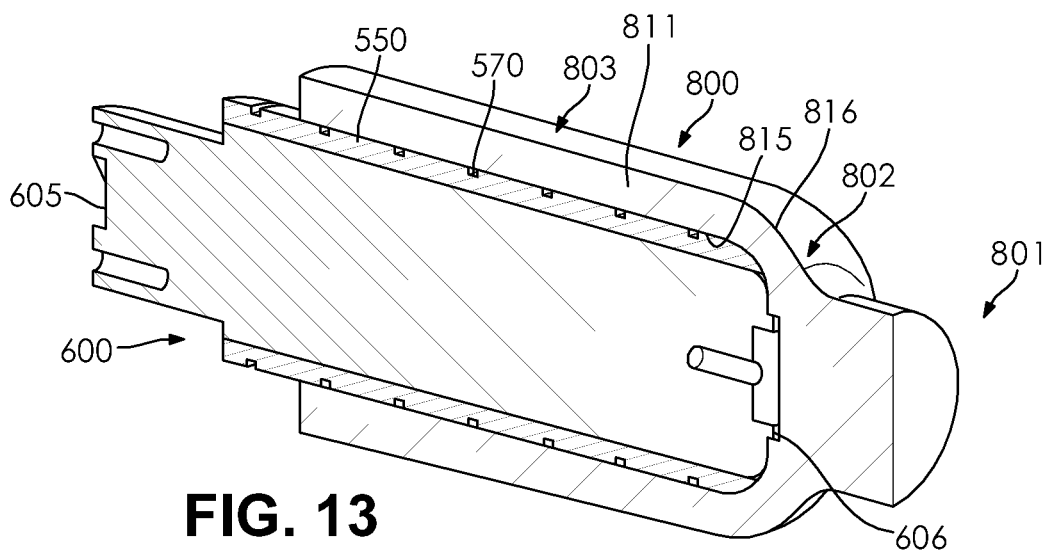
FIG. 13 is a perspective cross-sectional view showing the mandrel of FIG. 11 when received within a shaft preform according to a step of the disclosed method.
Figure 14:
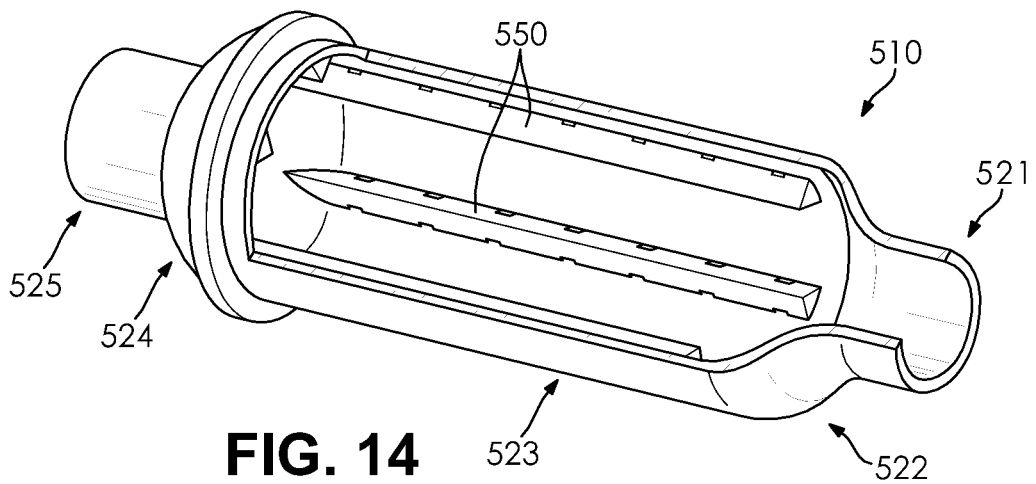
FIG. 14 is a perspective cut-away view of a rotor shaft having the cooling inserts extending into a hollow interior of the rotor shaft.

Referring now to FIGS. 10-16, a method of manufacturing a rotor shaft 510 according to yet another embodiment of the present invention is disclosed, wherein a completed rotor shaft 510 is shown in cut-away form in FIG. 14. The disclosed embodiment of the rotor shaft 510 is substantially similar in general configuration to the previously disclosed rotor shafts 10, 110, 210, 300, 410, but includes splines in the form of cooling inserts 550 that are independently provided and then captured during the method of manufacturing the rotor shaft 510.

The method of manufacturing the rotor shaft 510 includes a first step of providing a mandrel 600 and a plurality of the cooling inserts 550. The mandrel 600 includes a small diameter portion 602 disposed adjacent a large diameter portion 603. The small diameter portion 602 is formed at a first end 605 of the mandrel 600 and is cylindrical in shape. The large diameter portion 603 is disposed axially adjacent the small diameter portion 602 and includes a shoulder 608 at an end of the large diameter portion 603 where the change in radius occurs at the axial boundary present between the small diameter portion 602 and the large diameter portion 603. The shoulder 608 forms an end of an axially extending cylindrical segment 610 of the large diameter portion 603, wherein the cylindrical segment 610 may occupy a majority of an axial length of the mandrel 600. An arcuate transition segment 612 is disposed axially adjacent the cylindrical segment 610 and forms an annular convex surface having a decreasing radius towards a second end 606 of the mandrel 600.

The mandrel 600 further includes a plurality of insert indentations 620 formed therein. Each of the insert indentations 620 extends radially inwardly towards a central axis of the mandrel 600 relative to an outer circumferential surface 607 of the large diameter portion 603 disposed between adjacent ones of the insert indentations 620. Each of the insert indentations 620 further extends longitudinally in a direction parallel to an axial direction of the mandrel 600. Each of the insert indentations 620 forms a void having the same cross-sectional shape along the length of each of the insert indentations 620. In the present embodiment, each of the insert indentations 620 extends from the end of the cylindrical segment 610 as formed by the shoulder 608 to an axial position disposed along the arcuate transition segment 612 where the radius of the large diameter portion 603 has decreased from that of the adjacent cylindrical segment 610 with respect to a central axis of the mandrel 600.

Each of the insert indentations 620 includes a first lateral surface 621 and a second lateral surface 622 that meet at an edge 623 forming a radially innermost surface of each of the insert indentations 620, wherein the edge 623 is extended in the axial direction of the mandrel 600 along the length of each of the insert indentations 620. The edge 623 of each of the insert indentations 620 is disposed radially outwardly of the outer circumferential surface of the cylindrical small diameter portion 602. The first lateral surface 621 and the second lateral surface 622 of each of the insert indentations 620 may be disposed at equal inclines relative to a radial direction of the mandrel 600 originating at the central axis thereof and progressing radially outwardly through the edge 623 of the corresponding insert indentation 620 with the equal inclines formed to opposing sides of the corresponding radial direction. The lateral surfaces 621, 622 may accordingly form a V-shape symmetric about the edge 623 of the corresponding insert indentation 620.

Figure 11:
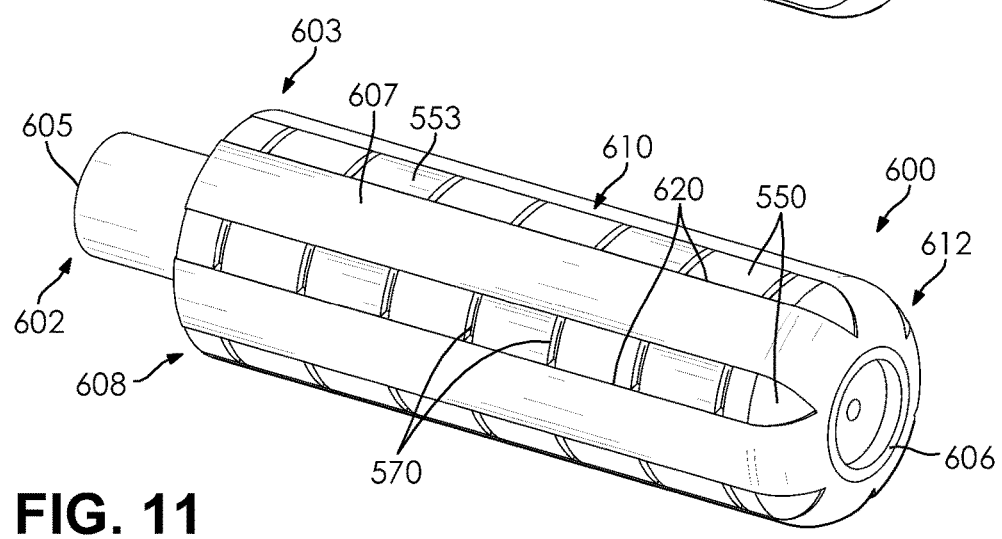
FIG. 11 is a front perspective view of the mandrel of FIG. 10 with cooling inserts installed therein.

As shown by reference to FIG. 11, the method of manufacturing the rotor shaft 510 includes a second step of locating each of the cooling inserts 550 forming the internal splines of the rotor shaft 510 into a corresponding one of the insert indentations 620 formed in the mandrel 600. Each of the cooling inserts 550 accordingly includes structure corresponding to that of the void formed by each of the insert indentations 620 within the mandrel 600. Specifically, as shown in FIG. 12, each of the cooling inserts 550 includes a first lateral surface 551, a second lateral surface 552, and a connecting surface 553. The lateral surfaces 551, 552 meet at an edge 555 and the connecting surface 553 joins the lateral surfaces 551, 552 at the respective ends thereof disposed opposite the edge 555. When each of the cooling inserts 550 is received within the corresponding one of the insert indentations 620, the lateral surfaces 551, 552 may be equally inclined to opposing sides of a radial direction of the mandrel 600 originating from the central axis thereof and passing through the edge 555 of the corresponding cooling insert 550. In other words, the edge 555 may point directly radially inwardly towards the central axis of the mandrel 600 when received in one of the insert indentations 620. The connecting surface 553 may also include the contour of an arc of a circle wherein the connecting surface 553 has a constant radius of curvature when extending between the lateral surfaces 551, 552, wherein the radius of curvature of the connecting surface 553 corresponds to the radius of the outer circumferential surface 607 of the large diameter portion 603 at the axial position at which the radius of curvature is being determined. This curvature results in a configuration wherein, when the cooling inserts 550 are all received in the corresponding insert indentations 620, the outer circumferential surface 607 of the large diameter portion 603 in cooperation with the connecting surface 553 of each of the cooling inserts 550 forms a circular and cylindrical outer circumferential surface.

Each of the cooling inserts 550 further includes a plurality of retention channels 570 formed therein that deviate from this shared circular and cylindrical outer circumferential surface. Each of the retention channels 570 extends laterally across the connecting surface 553 to intersect each of the opposing lateral surfaces 551, 552 at opposing ends of the respective retention channel 570. Each of the retention channels 570 may accordingly extend substantially in the circumferential or tangential direction of the mandrel 600, each of which is arranged perpendicular to the axial direction of the mandrel 600, when the cooling insert 550 is received within one of the insert indentations 620. Each of the retention channels 570 may include a substantially rectangular or trapezoidal cross-sectional shape when viewed from the tangential direction of the connecting surface 553.

Figure 16:
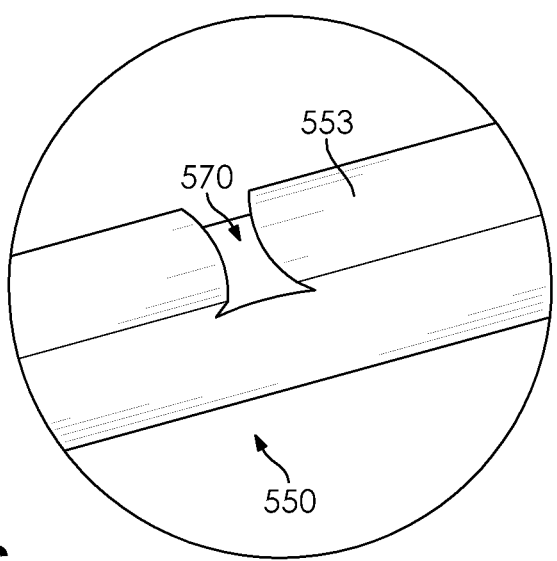
FIG. 16 is an enlarged perspective view of an exemplary retention channel of one of the cooling inserts.

FIG. 16 illustrates an enlarged view of an exemplary retention channel 570 according to the present invention. The illustrated retention channel 570 includes a substantially trapezoidal cross-sectional shape extended circumferentially/tangentially across the connecting surface 553 with an undercut formed by each of the opposing legs of the trapezoidal shape. The base of the trapezoidal shape may also be formed to be slightly convex such that the base has an increasing slope towards each of the opposing legs of the trapezoidal shape. The cross-sectional shape is also shown as having a progressively decreasing distance between the opposing legs when approaching a center of the connecting surface 553 with respect to the circumferential direction, wherein this decreasing distance occurs when approaching the center of the connecting surface 553 from each of the lateral surfaces 551, 552. This decreasing distance causes the retention channel 570 to include a substantially hourglass perimeter shape when viewed from a direction corresponding to the radial direction of the mandrel 600 when the cooling insert 550 is received within one of the insert indentations 620 thereof.

The connecting surface 553 of each of the cooling inserts 550 is accordingly configured to be substantially continuous with the cylindrically shaped surfaces (or otherwise axially symmetric surfaces) of the mandrel 600 when the corresponding one of the cooling inserts 550 is received within one of the insert indentations 620, whereas each of the retention channels 570 deviates radially inwardly from this cylindrical (axially symmetric) shape. The retention channels 570 also may form undercuts relative to this cylindrical shape in addition to being indented relative thereto.

The method of manufacturing the rotor shaft 510 further includes a step of providing a shaft preform 800. The shaft preform 800 is shown in FIG. 13 as including a solid, cylindrical, and closed off end portion 801, a transition portion 802 forming a circumferential wall 811 extending axially and radially outwardly away from the solid end portion 801, and a cylindrical portion 803 extending axially away from a radially outer end of the transition portion 802. The circumferential wall 811 includes an inner circumferential surface 815 and an oppositely arranged outer circumferential surface 816. The inner circumferential surface 815 is substantially cylindrical along the cylindrical portion 803 and arcuate and concave where the transition portion 802 first deviates from the cylindrical portion 803, whereas the outer circumferential surface 816 is substantially cylindrical along the cylindrical portion 803 and arcuate and convex where the transition portion 802 first deviates from the cylindrical portion 803. The inner circumferential surface 815 has an inner diameter along the cylindrical portion 803 that is substantially equal to or slightly greater than the outer diameter of the mandrel 600 along the cylindrical segment 610 of the large diameter portion 603 thereof.

The method of manufacturing the rotor shaft 510 further includes a step of causing relative axial motion between the mandrel 600 having the cooling inserts 550 installed therein and the shaft preform 800 to cause at least a portion of the mandrel 600 to be received axially within a hollow opening defined by the inner circumferential surface 815 along the circumferential wall 811 of the shaft preform 800. The mandrel 600 is advanced axially relative to the shaft preform 800 until the second end 606 of the mandrel 600 contacts an end of the end portion 801 axially delimiting the hollow opening formed by the circumferential wall 811, which corresponds to the circumferential wall 811 extending around at least a portion of a length of each of the cooling inserts 550.

The method then includes a step of flow forming the shaft preform 800 relative to the mandrel 600 in order to capture and retain the cooling inserts 550 within the resulting rotor shaft 510. The flow forming process includes a plurality of rollers applying radially inwardly extending pressure to the shaft preform 800 as the rollers progress axially over the shaft preform 800 in a direction from the end portion 801 towards a distal end of the cylindrical portion 803 as formed by an annular end of the circumferential wall 811. As the rollers progress axially, the circumferential wall 811 is shaped appropriately at the interface with the rollers while the material of the shaft preform is compressed and caused to flow radially inwardly to conform to the shape of the mandrel 600 and the cooling inserts 550 installed therein.

The radial compression of the material forming the shaft preform 800 causes at least some of the material to enter into each of the retention channels 570 exposed along the connecting surface 553 of each of the cooling inserts 550. With reference to the retention channel 570 disclosed in FIG. 16, the presence of the undercuts in the cross-sectional shape of the retention channel 570 causes at least some of the material to flow radially under the undercuts in order to delimit radial inward motion of the cooling insert 550 relative to the portion of the circumferential wall 811 deformed over the corresponding retention channel 570. This process is also facilitated by the convex surface formed by the base of the trapezoidal shape of the retention channel 81 as well as the hour-glass perimeter shape of the retention channel 570, each of which guides the material towards the corners of the corresponding retention channel 570 corresponding to a maximum undercut in the cross-sectional shape of the channel 570. The circumferential wall 811 is also disposed radially outwardly of the cooling insert 550 to delimit radial outward motion of the cooling insert 550 following the capture thereof. Lastly, the radial inward indenting of the retention channel 570 causes the material flowing radially inwardly therein to delimit axial motion of the cooling insert 550 relative to the shaft preform 800. Each of the cooling inserts 550 is accordingly affixed in position relative to the deformed circumferential wall 811 of the preform 800, which corresponds to the splined portion 523 of the completed rotor shaft 510 as shown in FIG. 14.

The method according to the present invention further includes a step of causing relative axial motion between the circumferential wall 811 (splined portion 523) and the mandrel 600 to remove the mandrel 600 from the resulting tubular structure. The manner in which each of the insert indentations 620 includes the same cross-sectional shape along the entirety of the length of the mandrel 600 allows for the cooling inserts 550 to slide along the lateral surfaces 621, 622 of the insert indentations 620 during the relative axial motion for easily removing the mandrel 600 absent interference therebetween. In some embodiments, each of the lateral surfaces 621, 622 may be coated or treated with a lubricating material or substance to aid in the sliding present between the cooling inserts 550 and the lateral surfaces 621, 622.

As shown in FIG. 14, the resulting rotor shaft 510 includes an open first end portion 521, a radially flared first transition portion 522, a cylindrical splined portion 523, a radially flared second transition portion 524, and a solid second end portion 525. An inner circumferential surface 515 of a circumferential wall 511 of the rotor shaft 510 includes the cooling inserts 550 projecting radially inwardly therefrom for extension into a hollow interior 518 of the rotor shaft 510 along the splined portion 523 thereof. The cooling inserts 550 are disposed such that the connecting surface 553 of each of the cooling inserts 550 contacts the inner circumferential surface 515 while the lateral surfaces 551, 552 extend into the hollow interior 518.

The cooling inserts 550 may be formed from any material having suitable heat exchange properties for promoting the desired heat transfer from the rotor shaft 510. In some embodiments, the cooling inserts 550 are formed from the same material as the shaft preform 800. In other embodiments, the cooling inserts 550 are formed from a different material than the shaft preform 800, wherein the different material corresponds to a material having a greater capacity for heat transfer from the rotor shaft 510.

The cooling inserts 550 are also not limited to the disclosed triangular or pie-shaped cross-sectional shape. Instead, each of the cooling inserts 550 may include substantially any cross-sectional shape, including rectangular, trapezoidal, or the like, while remaining within the scope of the present invention, so long as the corresponding connecting surface includes the cylindrical contour for matching the cylindrical shape of the mandrel 600. In fact, the shapes achievable via the use of the cooling inserts 550 may include the use of irregular shapes or shapes with an expanding geometry in the radial inward direction, as the shape of the radially inwardly extending features of each of the cooling inserts 550 does not affect the manner of capturing the inserts 550 during the disclosed process. The rotor shaft 510 may also include any number of the cooling inserts 550 of any size and configuration, any circumferential spacing present between the cooling inserts 550, and any combination of cooling inserts 550 of differing configurations while remaining within the scope of the present invention.

The use of separate components captured by the flow forming process in forming the splines of the rotor shaft 510 provides numerous advantages over the previously disclosed process of flow forming such splines directly due to the manner in which the size, shape, and configuration of such cooling inserts 550 is not significantly impacted by the limitations of the corresponding process. Specifically, the flow forming of such splines may limit the depth, thickness, or prevalence of such splines due to the limitations inherent to the flow forming process.

Figure 15:
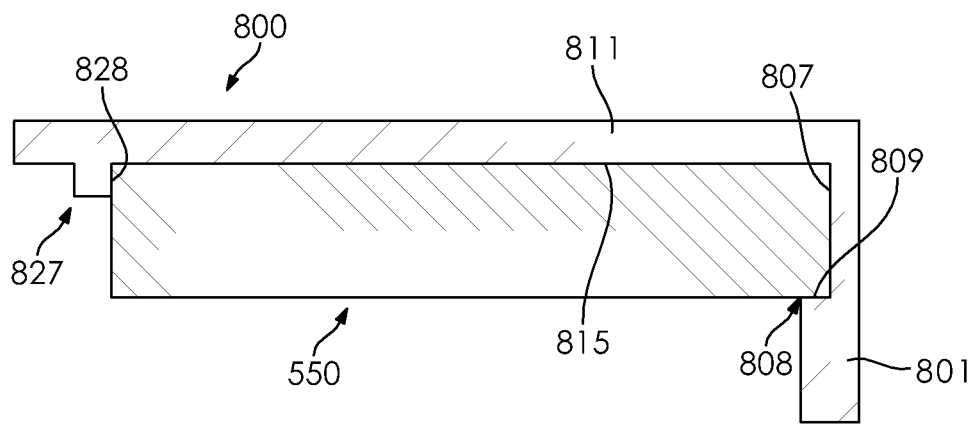
FIG. 15 is a fragmentary cross-sectional view showing a configuration suitable for capturing one of the cooling inserts during a flow forming process.

Referring now to FIG. 15, an alternative method of affixing a position of each of the cooling inserts 550 is disclosed with reference to a simplified cross-sectional view showing the interaction between the shaft preform 800 and one of the cooling inserts 550 during the capturing process. The shaft preform 800 includes an annular channel 807 formed in the end portion 801 thereof at a radial position adjacent the circumferential wall 811 extending away from the end portion 801. The annular channel 807 defines a step 808 having an axially extending surface 809. An end of the cooling insert 550 may be axially received into the channel 807 at a position between the axially extending surface 809 and an inner circumferential surface 815 of the preform 800. Once so received, a flow forming process may be applied to the circumferential wall 811 to create a radially inwardly extending step 827 having a radially extending surface 828 at an end of the cooling insert 550 opposite the annular channel 807. The cooling insert 550 is axially constrained between the surface of the end portion 801 defining the annular channel 807 and the radially extending surface 828 of the step 827, while being radially and rotationally constrained by the cooperation of the steps 808, 827. The disclosed method of capturing the cooling insert 550 may be alternative to or additional to the use of the retention channels 570, as desired.

From the foregoing description, one ordinarily skilled in the art can easily ascertain the essential characteristics of this invention and, without departing from the spirit and scope thereof, can make various changes and modifications to the invention to adapt it to various usages and conditions.

We claim:

1. A rotor shaft for an electric motor comprising:
an axially extending tubular body having an inner circumferential surface defining a hollow interior thereof, at least a portion of the hollow interior configured to receive a coolant therein;
a plurality of circumferentially spaced splines extending radially inwardly from the inner circumferential surface into the at least a portion of the hollow interior configured to receive the coolant therein, each of the splines configured to provide a heat exchanging structure for transferring heat from the rotor shaft to the coolant; and
an inner tube received axially within the hollow interior of the tubular body, wherein a first flow space for the coolant is formed within the inner tube and a second flow space for the coolant is formed between the inner tube and the tubular body with respect to a radial direction of the tubular body, wherein the splines extend radially inwardly into the second flow space.

2. The rotor shaft of claim 1, wherein the tubular body includes a first end portion having a first outer diameter, an oppositely arranged second end portion having a second outer diameter, and a cylindrical portion disposed between the first end portion and the second end portion and having a third outer diameter, wherein the third diameter is greater than each of the first diameter and the second diameter.

3. The rotor shaft of claim 2, wherein the plurality of the splines extends radially inwardly from the cylindrical portion of the tubular body.

4. The rotor shaft of claim 3, wherein the first end portion is open ended and provides a fluid inlet into the hollow interior of the tubular body.

5. The rotor shaft of claim 1, wherein the splines are formed using one of a flow forming process, a cold forging process, or a hot forging process.

6. The rotor shaft of claim 1, wherein each of the splines extends longitudinally at an incline with respect to an axial direction of the tubular body.

7. The rotor shaft of claim 1, wherein the tubular body includes a sensing structure including a plurality of circumferentially repeated indentations and/or projections, wherein the sensing structure is formed integrally with the tubular body using one of a cold forging process or a hot forging process.

8. The rotor shaft of claim 7, wherein the sensing structure is formed adjacent a closed end of the tubular body delimiting the hollow interior thereof in an axial direction of the tubular body.

9. The rotor shaft of claim 1, wherein at least one first communication opening formed through the inner tube provides fluid communication between the first flow space and the second flow space, and wherein at least one second communication opening formed through the tubular body provides fluid communication between the second flow space and an exterior of the tubular body.

10. The rotor shaft of claim 1, wherein the inner tube is captured by the tubular body during a necking process carried out with respect to an end portion of the tubular body.

11. The rotor shaft of claim 1, wherein the tubular body is divided axially into a first shaft segment and a second shaft segment, wherein each of the splines spans a joint present between the first shaft segment and the second shaft segment.

12. The rotor shaft of claim 11, wherein a connecting unit is disposed within the hollow interior of the tubular body to span the joint present between and engage each of the first shaft segment and the second shaft segment.

13. The rotor shaft of claim 1, wherein each of the splines is provided as a cooling insert coupled to the inner circumferential surface of the tubular body.

14. The rotor shaft of claim 13, wherein each of the cooling inserts is captured by the tubular body during a flow forming process.

15. The rotor shaft of claim 14, wherein each of the cooling inserts includes a retention channel formed therein, wherein each of the retention channels is configured to receive material originating from the tubular body therein during the flow forming process to affix a position of the corresponding cooling insert to the tubular body.

16. A rotor shaft for an electric motor comprising:
an axially extending tubular body having an inner circumferential surface defining a hollow interior thereof, at least a portion of the hollow interior configured to receive a coolant therein; and
a plurality of circumferentially spaced splines extending radially inwardly from the inner circumferential surface into the at least a portion of the hollow interior configured to receive the coolant therein, each of the splines configured to provide a heat exchanging structure for transferring heat from the rotor shaft to the coolant, wherein the tubular body is divided axially into a first shaft segment and a second shaft segment, wherein each of the splines spans a joint present between the first shaft segment and the second shaft segment, and wherein a connecting unit is disposed within the hollow interior of the tubular body to span the joint present between and engage each of the first shaft segment and the second shaft segment.

17. A rotor shaft for an electric motor comprising:
an axially extending tubular body having an inner circumferential surface defining a hollow interior thereof, at least a portion of the hollow interior configured to receive a coolant therein; and
a plurality of circumferentially spaced splines extending radially inwardly from the inner circumferential surface into the at least a portion of the hollow interior configured to receive the coolant therein, each of the splines configured to provide a heat exchanging structure for transferring heat from the rotor shaft to the coolant, wherein each of the splines is provided as a cooling insert coupled to the inner circumferential surface of the tubular body, and wherein each of the cooling inserts is captured by the tubular body during a flow forming process.

18. The rotor shaft of claim 17, wherein each of the cooling inserts includes a retention channel formed therein, wherein each of the retention channels is configured to receive material originating from the tubular body therein during the flow forming process to affix a position of the corresponding cooling insert to the tubular body.

* * * * *